United States Patent [19]
Olschewski et al.

[11] 4,421,363
[45] Dec. 20, 1983

[54] ROLLING BEARING FOR LENGTHWISE MOVEMENT HAVING RESILIENT GUIDE ELEMENT

[75] Inventors: Armin Olschewski, Schweinfurt; Manfred Brandenstein, Eussenheim; Lothar Walter, Schweinfurt, all of Fed. Rep. of Germany

[73] Assignee: SKF Kugellagerfabriken GmbH, Schweinfurt, Fed. Rep. of Germany

[21] Appl. No.: 245,518

[22] Filed: Mar. 19, 1981

[30] Foreign Application Priority Data

Mar. 28, 1980 [DE] Fed. Rep. of Germany ....... 3012018

[51] Int. Cl.³ .................................. F16C 29/06
[52] U.S. Cl. ............................. 308/6 C; 308/6 R
[58] Field of Search ............ 308/6 C, 6 R, 3 A, 6 A, 308/3 R, 6 B

[56] References Cited

U.S. PATENT DOCUMENTS

| 3,844,629 | 10/1974 | Haines | 308/6 C |
| 3,881,787 | 5/1975 | Nilsson | 308/6 C |
| 4,030,191 | 6/1977 | Ernst et al. | 308/6 C |
| 4,127,309 | 11/1978 | Teramachi | 308/6 C |
| 4,128,279 | 12/1978 | Ernst et al. | 308/6 C |

Primary Examiner—Stuart S. Levy
Assistant Examiner—Thomas R. Hannon
Attorney, Agent, or Firm—Daniel M. Rosen

[57] ABSTRACT

A rolling bearing for lengthwise movement between a sliding element and a rail element has a cage arranged between the sliding element and the rail element, and at least one endless row of rolling bodies in the cage. The loaded rolling bodies of each row roll between longitudinal races of the slide element and the rail element, and the cage has longitudinal guides for loaded rolling bodies and unloaded rolling bodies, as well as turnaround guides for interconnecting the loaded and unloaded guides at each end. An elastic guide element is mounted on at least one side of one of the guide tracks to resiliently urge the rolling against the guide tracks.

11 Claims, 6 Drawing Figures

ROLLING BEARING FOR LENGTHWISE MOVEMENT HAVING RESILIENT GUIDE ELEMENT

BACKGROUND OF THE INVENTION

This invention relates to a rolling bearing for lengthwise movement between a sliding element and a rail element, comprised of at least one cage arranged between the slide element and the rail element, and at least one endless row of rolling bodies in the cage. In such arrangements, the loaded rolling bearings have each a row of rolling bodies which roll between longitudinal races of the slide element and the rail element, and the cage has longitudinal guide tracks for loaded rolling elements and unloaded rolling elements, and a pair of turn-around guide tracks are arranged to interconnect adjacent pairs of longitudinally extending races.

A rolling bearing of the above type is known, in which longitudinally directed elastic-yielding walls forming guide tracks are provided in the cage, in order to enable snapping of the rolling bodies in the races of the respective rows of rolling bodies, and to prevent the rolling bodies from falling out of the cage (DE-GM No. 1,896,804). This known arrangement has the disadvantage that the cage must be fabricated from a relatively yielding material, which is not always desirable for a cage. In addition, in the above described rolling bearing the rolling bodies roll with play between the walls of the races, so that the rolling bodies can move from side to side in the races and become jammed therein. As a result, in the above arrangements wherein the rolling bodies roll one after the other in a row, noisy intermittent running of the rolling bodies occurs and the rolling bodies abut one another.

The present invention is therefore directed to the provision of a rolling bearing for lengthwise movement that overcomes the above disadvantages of the known arrangements.

SUMMARY OF THE INVENTION

In accordance with one embodiment of the invention, a rolling body for lengthwise movement of the above type is provided, in which the cage is fabricated from a relatively stiff wear resistant material, whereby accurate, noise free and play free guiding of the rolling elements in the cage can be simultaneously insured. The rolling bearing of the invention can be manufactured in a simple and economical manner.

In accordance with the invention, a guiding element, for example of an elastic compressible plastic material, is provided to lightly urge the rolling bodies against the side walls of the guide channels in the cage or against the lengthwise directed races of the slide element, or the rail element so that the rolling bodies are guided without play and with accurate alignment in endless rows, one after the other. Blocking of the balls and striking of the opposite side walls by the circulating balls in the cage is thereby inhibited, and smooth silent running of the balls in operation is insured. The cage can be fabricated of a stiff wear resistant material, for example, a sintered metal. The contact wear on the rolling bodies and in the guide tracks of the cage is consequently reduced.

In one embodiment of the invention, for a long operational life the rolling bearing is provided with liquid or solid lubricating material. The maintenance of the rolling bearing in operation is accordingly simplified. In addition, due to the provision of good lubricating conditions for rolling bodies or the races of the slide element on the rail element and in the races of the cage, the bearing has a proportionally long life span, since the contact wear in the rolling bearing is very small. In a further embodiment of the invention, the material of the guide element is advantageously produced of a plastic element filled with lubricant and thereby can store a large amount of lubricant for lubrication of the rolling elements.

In a still further embodiment of the invention, the guide element is advantageously provided in the form of an endless band, and can be usually anchored in corresponding recesses of the cage or the sliding element.

In a still further embodiment of the invention, the guide element is enclosed by other elements of the bearing, so that the elastic material of the guide element is protected against damage due to external conditions, for example, due to the use of work tools during its assembly. Due to the automatic release of lubricating material through the material of the guide element, at the same time the advantage is provided that the lubricating material of the guide element can flow to the rolling bodies and to the guide channels, while the undesired outward flow or escape of the lubricating material is avoided.

In order that the invention will be more clearly understood, it will now be disclosed in greater detail with reference to the accompanying drawings, wherein:

DESCRIPTION OF THE DRAWINGS AND PREFERRED EMBODIMENTS

Figure 1:
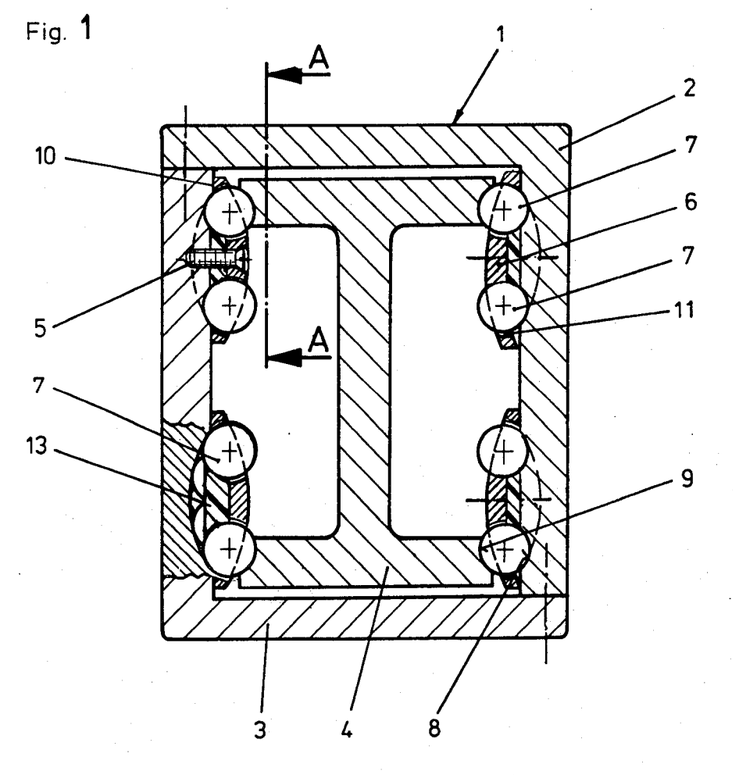
FIG. 1 is a transverse cross-sectional view of a rolling bearing for longitudinal movement, in accordance with one embodiment of the invention.

Referring now to the drawing, FIG. 1 illustrates a slide element 1 for a rolling bearing for longitudinal movement, comprised of two angle shaped elements 2 and 3 that are bolted together, so that the slide element 1 has a box-like cross-section. A rail element 4, having an I-shaped cross-section, extends through the inside of the slide element 1. Four cages 6 are bolted between the slide element 1 and the rail 4, the cages 6 being affixed to the slide element 1 by screws 5. The cage 6 may be of a rigid sintered material or plastic. An endless row of rolling bodies 7 is inserted in each cage, the rolling bodies in the illustrated embodiment of the invention being balls.

The loaded balls 7 of each row run between the longitudinally directed race 8 of each slide element 1 and the opposite longitudinally directed races 9 of the rails 4.

Figure 2:
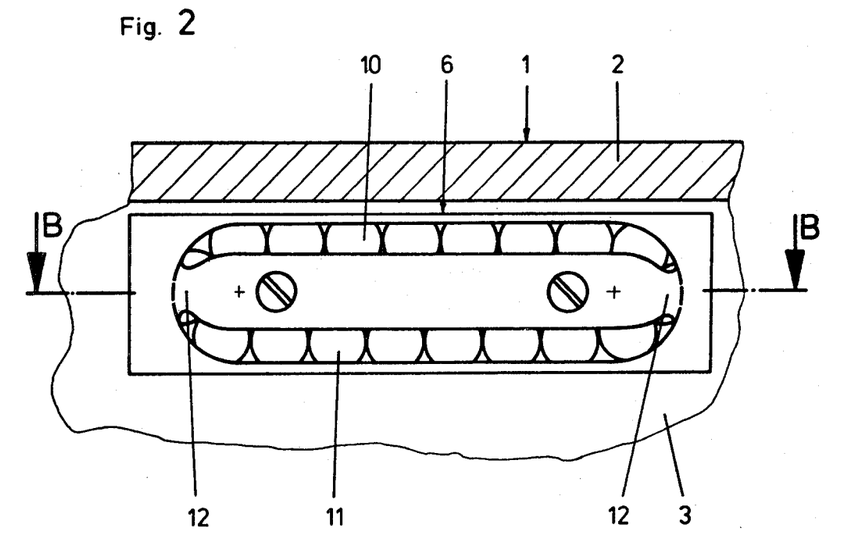
FIG. 2 is a cross-sectional view of a portion of the rolling bearing of FIG. 1, taken in the direction of the arrows A—A.
Figure 3:
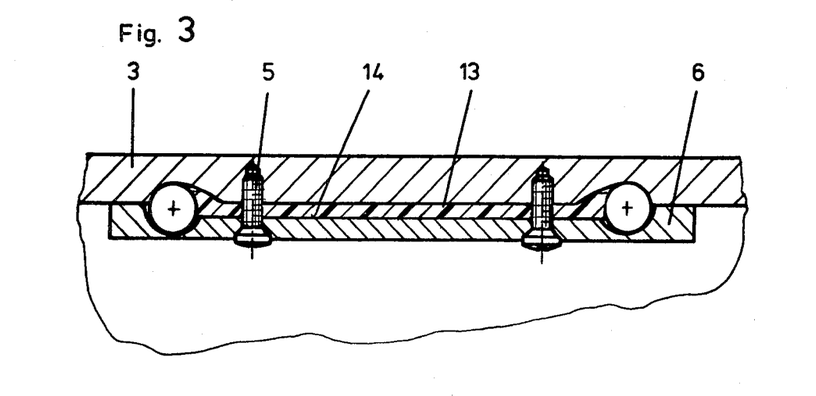
FIG. 3 is a cross-sectional view of a portion of the bearing of FIG. 2, taken along the lines B—B.

As is more clearly seen in FIGS. 2 and 3, each cage 6 has a longitudinally extending race 10 for the loaded rolling bodies 7, a return race 11 for the unloaded rolling bodies 7, and two turn-around guide races 12 interconnecting pairs of the races 10 and 11. The rolling bodies 7 are thus arranged in closed rows in the cage 6.

A guide plate 13 is fastened to the cage 6 in the slide element 1. The guide plate 13 extends along the insides of the rolling body race 10, the return race 11 and both of the turn-around races 12. The guide plate 13 extends slightly under the rolling bodies 7 into the corresponding race and, due its elasticity, pushes the rolling bodies with light initial pressure essentially in the direction of the races 9 of the rail 4, so that these rolling bodies 7 are held positively, without play, in the races 10, 11 and 12 of the cage.

In the arrangement of the invention illustrated in FIGS. 1, 2, and 3, the guide plate 13 is in the form of an "island" between the race 10 for loaded rolling elements, the return race 11 and the two turn-around races 12 for the rows of rolling bodies. Each guide plate 13 is affixed in a corresponding recess 14 of the cage 6, for example, by an adhesive. The guide plate 13 and cage 6 thus form a self-contained component into which the rolling elements 7 can be readily snapped into the races 10, 11, and 12. This self contained component may be easily and readily affixed to or detached from the slide element 1, by means of the screws 5.

The guide plate 13 in the above example is of an opened cell foamed material filled with lubricating oil, and in this arrangement it supplies the necessary lubricant, in the form of lubricating oil, continuously to the rolling bodies 7 during the whole life span of the rolling bearing for lengthwise movement. In the assembled condition, as illustrated in FIG. 1, the guide plate 13 is enclosed by cage 6 and the slide 1 on the sides thereof which are not directed to the races 10, 11 and 12 in the respective row of rolling bodies. As a result the guide plate 13 does not directly release its lubricating oil to the surrounding area, so that waste of the lubricating oil is minimized.

Figure 4:
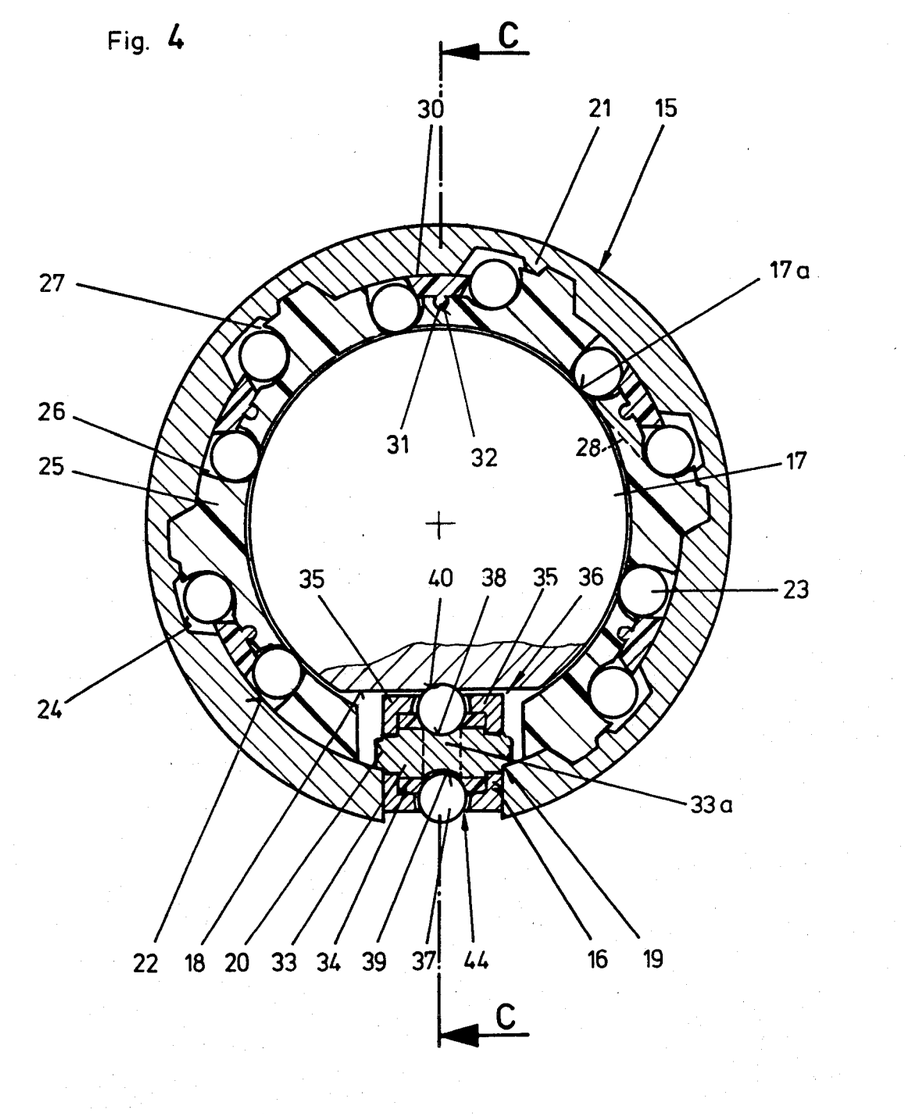
FIG. 4 is a transverse cross-sectional view of a bearing for longitudinal movement in accordance with a further embodiment of the invention.
Figure 5:
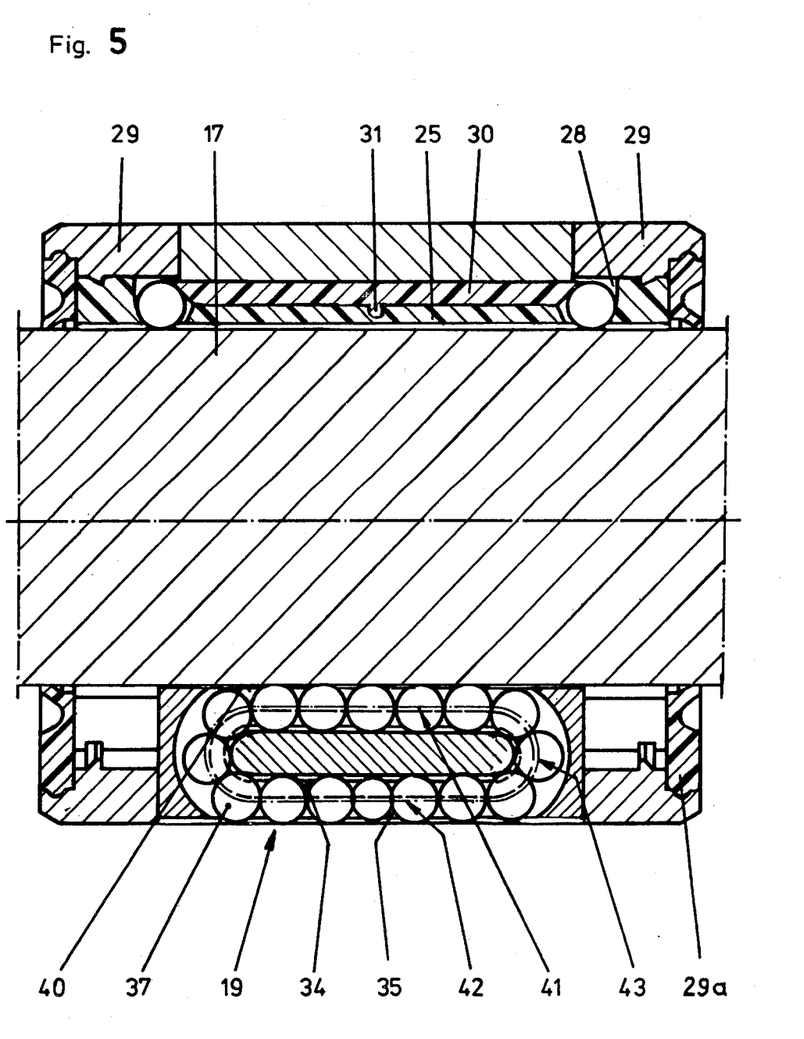
FIG. 5 is a cross-sectional view of the rolling bearing of FIG. 4, taken along the plane indicated by the arrows C—C.

FIGS. 4 and 5 of the drawings show a modification of the rolling bearing for lengthwise movement in accordance with the invention, wherein the sleeve-shaped slide element 15 is provided with a slot-shaped radially extending opening 16 therein. A rod-shaped rail 17, having longitudinally extending flat side 18, extends through the slide element 15. An insert 19 is provided in the slot-shaped opening 16 of the slide element 15. The insert 19 is supported in the bore of the outer sleeve 21 of the slide element 15 in the radial outward direction by the holding ribs 20 thereof which engage the inner surface of the slide element 15 adjacent the opening 16. The insert 19 extends into the opening, so that the insert is thereby held in the circumferential direction of the rolling bearing.

The outer sleeve 21 of the slide element 15 has longitudinally extending races 22 in its bore (which may be just the inner surface of the bore), for the loaded rolling bodies 23, and longitudinally directed grooves 24 for the unloaded rolling bodies 23, for five circumferentially distributed closed rows of rolling bodies 23, in the illustrated embodiment of the invention. It is of course apparent that different members of rows may be provided, in accordance with the invention. A cage 25 slotted in the same manner as the outer sleeve 21, is positioned in the bore of the outer sleeve 21. For each row of rolling bodies 23, the cage 25 has a longitudinally extending guide 26 for loaded rolling bodies 23, a return guide 27 for the unloaded rolling bodies 23 and two turn-around guides 28 interconnecting pairs of the guides 26 and 27, these guides being formed in the cage. The loaded rolling bodies 23 of each row roll between the longitudinally extending races 22 of the outer sleeve 21 of the slide element 15 and the longitudinally extending race 17a on the cylindrical outer surface of the rail 17. An annular end cap 29 is positioned on each end of the cage 25, as shown in FIG. 5, these end caps 29 engaging the ends of the outer sleeve 21 and holding this outer sleeve in the axial direction. As illustrated, the end caps may have annular internal ridges engaging similar shaped external grooves in the cage. An elastic sealing ring 29a is snapped in the bore of each end cap 29.

An inserted elastic guide plate 30 serving as an "island" element, is provided between the guide tracks 26, 27 and 28 of each row of balls, and extending along the inner sides of the guide track 26 for loaded rolling bodies 23, return guide track 27 and the respective turn-around guide tracks 28. These guide plates 30, which can be fabricated from an elastic material, press the rolling bodies 23 substantially in the direction of the longitudinally extending races 17a of the rail 17, with light pre-stress. The guide plates are provided with radially inward directed knob-shaped projections 31 which tightly engage recesses 32 in the outer surface of the cage 25, to provide a simple technique for affixing the guide plates 30 to the cage 25. The guide plates 30 are supported against the bore of the outer sleeve 21.

The insert 19 mounted in the slot-shaped opening 16 has a race plate 33 from which the ridges 20 extend. A resilient guide plate 34 and a cap 35 are positioned on each side of the race plate 33 as shown in the cross section of plane C—C, in FIG. 5, these elements embracing the respective sides of the race plate 33. The two caps 35, which are of a wear resistant material, are screwed or welded together at their ends to form the cage 36. This cage retains both of the guide plates 34 and the row of rolling bodies 37, such as balls, against the race plate 33 so that the insert 19 comprises a self-contained component which, according to the need, may be inserted in the opening 16 or may be withdrawn therefrom.

A groove shaped lengthwise directed race 38 for loaded rolling bodies 37 is provided on the radially inner side of the race plate 33, and a groove-shaped lengthwise-directed race 39 for unloaded bodies 37 is provided on the radially outer side of race plate 33. Corresponding ends of both of the races 38 and 39 are connected together at the ends of race plate 33 by circular turn-around races 33a.

The loaded rolling bodies 37 roll between the lengthwise-directed race 38 of the race plate 33 of the insert 19 positioned in the slide element 15, and the groove-shaped race 40 of the rail element 17. Turning moments of the slide element 15 are transmitted to the rail element 17 by the loaded rolling elements 37 of the insert 19.

The guide elements 34 are arranged on the sides of both the rolling guide track 41 for loaded rolling elements, and the return guide track 42 for unloaded rolling elements, as well as along both turn-around guide tracks 43, of the rows of rolling bodies 37 in the cage 36. These guide elements 34 press the rolling bodies 37 with a small initial pressure radially outwardly with respect to the race plate 33, so that the rolling elements engage the race 40, the two oppositely directed outer edges 44 of the return guide 42 and both of the turn-around guides 43 of the cage 36. Each guide element 34 surrounds the race plate 33 within the cage 36, at a position closely displaced from the central plane C—C of FIG. 4, i.e. on the sides of the loaded rolling body guide track 41, return guide track 42 and turn-around guide track 43 directed away from the plane C—C. Each guide element 34, which in the above case may be comprised of an elastic sintered material adapted to release a lubricant such as molybdenum sulfide, graphite or the like, releases the lubricant material without loss to the abutting rolling bodies 37.

Since the insert 19 is the symmetrical, if race 38 for loaded balls of the race plate 33 is worn in operation, the insert 19 may be removed from the opening 16, then turned 180° about its lengthwise axis, and then reinserted in the opening 16, so that the previously unused race 39 of the race plate 33 can be employed for the loaded rolling elements 37. In this manner the life span of the rolling bearing can be increased.

Figure 6:
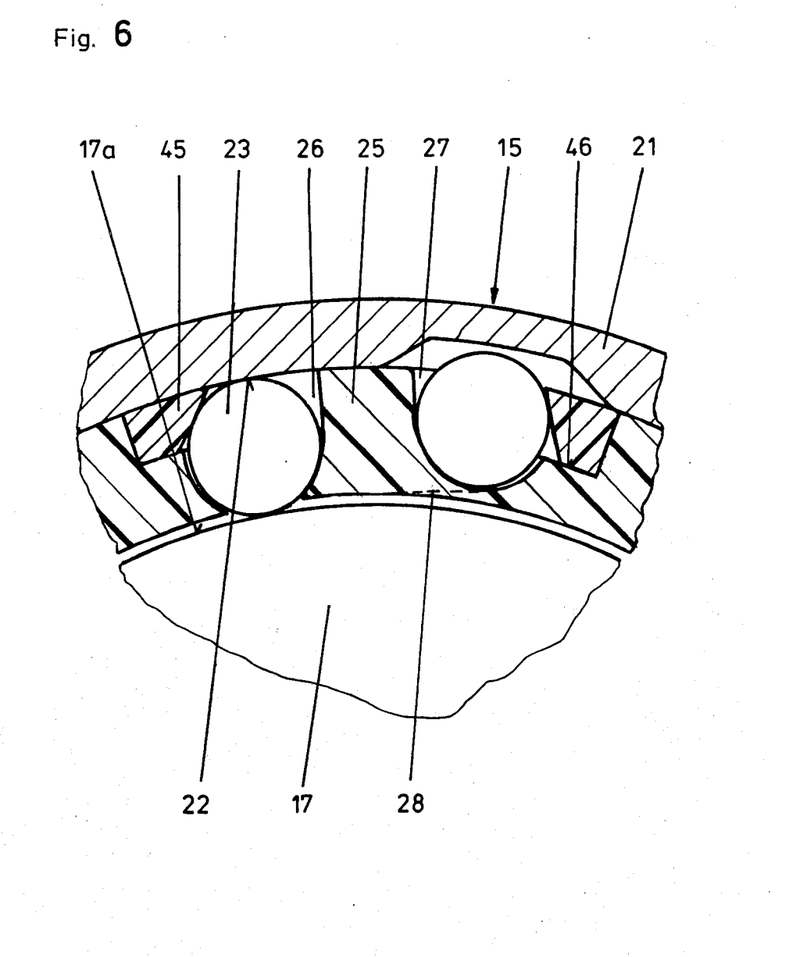
FIG. 6 is an enlarged transverse cross-sectional view of a portion of a modification of the rolling bearing for lengthwise movement of FIG. 4.

FIG. 6 is a partial cross-sectional view of the rolling bearing for lengthwise movement in accordance with the invention, that is a modification of the arrangement of FIGS. 4 and 5. In this case the rolling bearing has sleeve-shaped slide element 15 with an outer sleeve 21 and a relatively stiff cage 25 positioned in the bore of the outer sleeve 21 as in the arrangement of FIGS. 4 and 5. Similarly, endless rows of balls 23 are provided about the circumference of the cage 25. Each row of rolling bodies 23 is guided in a lengthwise-directed guide track 26 for loaded rolling elements 23, a return guide track 27 for unloaded rolling elements 23 and two turn-around guide tracks 28 interconnecting pairs of guide tracks 26 and 27. The loaded rolling bodies 23 of each row roll between the longitudinally directed cylindrical race 22 of the outer sleeve 21 of the slide element 15 and the longitudinally directed race 17a formed by the cylindrical outer surface of the inner element 17.

In the arrangement of FIG. 6, the guide element 45 is preferably in the form of an endless elastic band arranged to extend along the loaded element guide track 26, the return guide track 27 and both of the turn-around guide tracks 28. The guide element 45, which may be formed of an elastic lubricating material, for example, a porous material adapted to release lubricating oil, has a constant cross section. The guide element 45 is positioned in an endless recess 46 extending along the outer edge of the guide track 26 for loaded rolling elements, the return guide track 27 and the two turn-around guide tracks 28, such that the rolling bodies 23 are pressed, with light prestress, against the opposite-lying side walls of the guide tracks 26, 27 and 28, and radially inwardly against the lengthwise-directed race 17a. The rows of rolling bodies 23 are thereby accurately guided in their respective races. In view of the shock-absorbing characteristics of the elastic guide element 45, noise-free operation of the rolling bearing is insured.

The above-described example of the operation can be modified, in accordance with the teachings of the invention. For example, it is not necessary for the rolling bodies to be in the form of balls. Thus, the rolling elements can alternatively be rollers with cylindrical or tapered outer surfaces, with corresponding changes being made in the shape of the cross sections of the races of the slide element, the rail elements, races for loaded elments and return elements and in the turn-around races of the cages. When the rolling bodies have cylindrical outer surfaces, adjacent rolling bodies may be arranged with axis displaced at about 90°, i.e., to form a cross-roll bearing. In other embodiments of the invention it is of course apparent that each roll may be provided with spacing holders or spacing pieces, which are arranged between the individual rolling bodies and inhibit contact between adjacent rolling bodies.

What is claimed is:

1. In a rolling bearing for lengthwise movement between a slide element and a rail element, including at least one cage between the slide element and rail element and at least one endless row of rolling bodies positioned in the cage, the slide element and rail element having opposed lengthwise directed races between which the loaded rolling bodies of the row roll, the cage having a longitudinal first guide for loaded rolling bodies, a longitudinal second guide for unloaded rolling bodies, and a pair of turn-around guides joining the ends of the first and the second guides of the respective rows; the improvement wherein an elastic guide means is provided adjacent at least one side of at least one of said first and second guides and positioned to resiliently urge rolling elements in said one guide toward one of said races, said guide means being a plastic material filled with lubricating oil and being adapted to release lubricant.

2. The rolling bearing of claim 1 wherein said elastic guide means comprises an endless band extending adjacent said first, second and turn-around guides of the respective row of said cage.

3. The rolling wherein of claim 2 bearing said endless band has a constant cross-section.

4. The rolling bearing of claim 1 wherein said elastic guide means comprises an island element positioned adjacent and between the first, second and turn-around guides of the respective row of said cage.

5. The rolling bearing of claim 1 wherein said cage has at least one knob shaped recess, and said elastic guide means has at least one knob shaped projection received in said recess, for holding said elastic guide means and cage together.

6. The rolling bearing of claim 1 wherein said elastic guide means extends around the outside of the first, second and turn-around guides of the respective row of said cage.

7. The rolling bearing of claim 1 wherein said slide element comprises an elongated race element held adjacent said rail element and said elastic guide means encircles said slide element.

8. The rolling bearing of claim 1 wherein said elastic guide means comprises an element of substantially constant thickness held between said cage and one of said rail and slide elements.

9. The rolling bearing of claim 8 comprising means for clamping said elastic guide element between said cage and said slide element, said elastic guide element extending to engage portions of said rolling bodies between said rolling bodies and slide element to resiliently urge said rolling bodies away from the race of said slide element.

10. The rolling bearing of claim 1 wherein said elastic guide elements are held between said cage and one of said rail and slide element, and the edges of said elastic guide means adjacent the respective guide of said cage are bevelled to extend between portions of said rolling bodies of said row and said one of said rail and slide elements.

11. The rolling bearing of claim 10 comprising means holding said elastic guide means to said cage, whereby said rolling bodies are resiliently retained between said cage and said elastic guide means.

* * * * *

UNITED STATES PATENT AND TRADEMARK OFFICE
CERTIFICATE OF CORRECTION

PATENT NO. : 4,421,363

DATED : December 20, 1983

INVENTOR(S) : Arim Olschewski, et al

It is certified that error appears in the above-identified patent and that said Letters Patent is hereby corrected as shown below:

Column 1, line 12, "have each" should read -- each have --.

Column 5, line 11, omit "the" second occurrence.

Signed and Sealed this

Twenty-sixth Day of March 1985

[SEAL]

Attest:

DONALD J. QUIGG

Attesting Officer     Acting Commissioner of Patents and Trademarks

UNITED STATES PATENT AND TRADEMARK OFFICE
CERTIFICATE OF CORRECTION

PATENT NO. : 4,421,363
DATED : December 20, 1983
INVENTOR(S) : Arim Olschewski, et al It is certified that error appears in the above-identified patent and that said Letters Patent are hereby corrected as shown below:

Column 6, line 28, omit "wherein" and insert -- bearing --.

Column 6, line 28, omit "bearing" and insert -- wherein --.

Signed and Sealed this

Tenth Day of December 1985

[SEAL]

Attest:

DONALD J. QUIGG

Attesting Officer

Commissioner of Patents and Trademarks